United States Patent Office

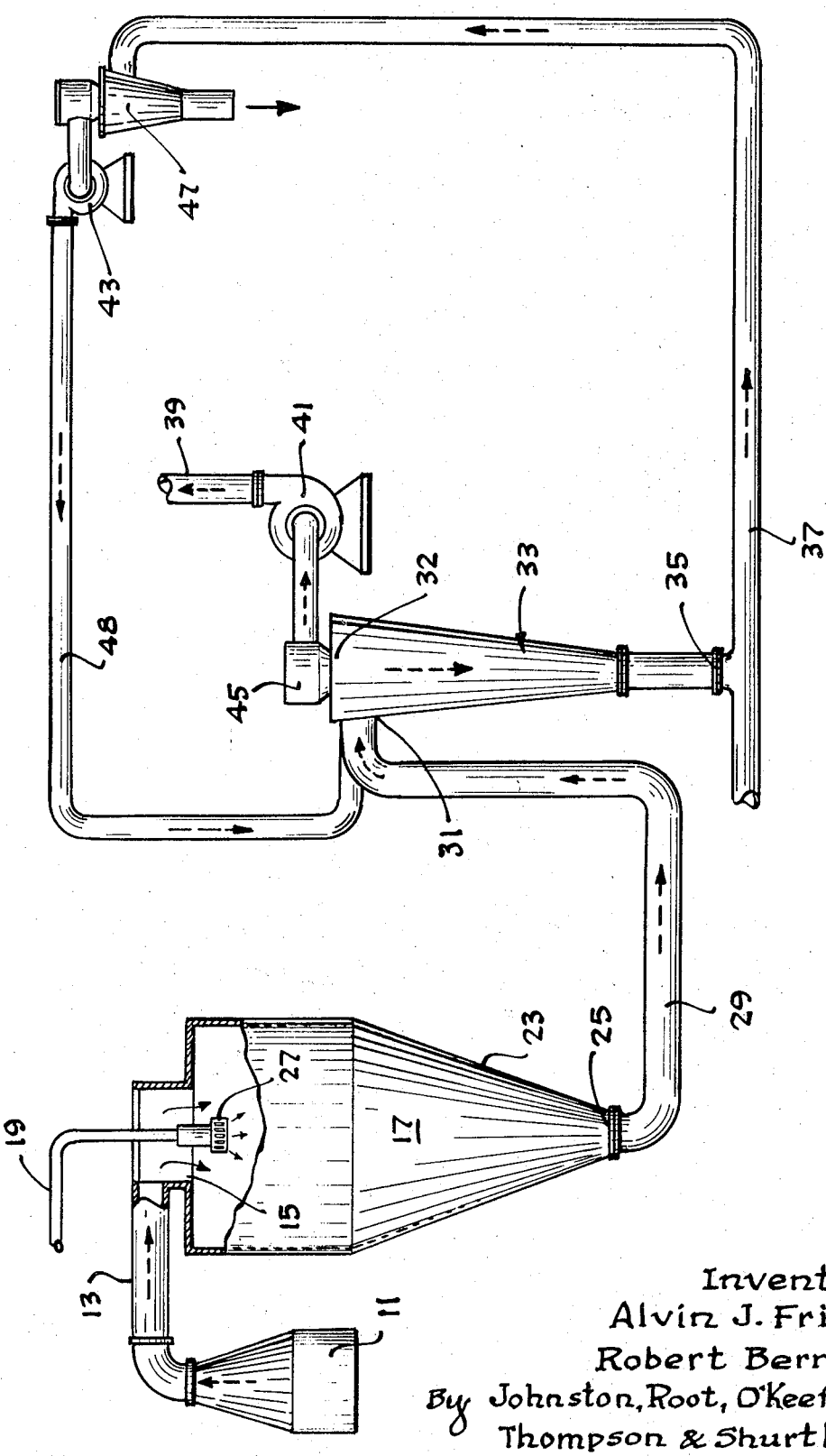

3,644,305
Patented Feb. 22, 1972

---

3,644,305
SPRAY POLYMERIZATION
Alvin J. Frisque, La Grange, and Robert Bernot, Chicago, Ill., assignors to Nalco Chemical Company, Chicago, Ill.
Filed Oct. 29, 1969, Ser. No. 872,319
Int. Cl. C08f 1/60
U.S. Cl. 260—80.3 N                    3 Claims

ABSTRACT OF THE DISCLOSURE

A new process of polymerization is disclosed by the use of a spray dryer. Polymer gels and polymers of low molecular weight can be prepared by this spray polymerization method.

INTRODUCTION

Many techniques have been devised for the polymerization of various compounds. The wide use of polymers is becoming more prevalent in industry for paper, sewage coagulation, textiles and a complex of other industries. Most of the methods of producing these polymers consist of emulsion polymerization, inverse emulsion polymerization or some system in which a solvent is necessary for the polymerization. When the polymerization is complete there remains the problem of removing the solvents. Many techniques have been devised for removing this solvent, some of which consist of evaporation, vacuum, azeotropic distillation, distillation and many others.

It would be a great advantage to the art if a system could be devised in which monomers could be polymerized and the solvent removed simultaneously.

It would be a further advantage to the art if this method was relatively fast.

Spray drying is a commercial process of producing dry product from a solution or slurry. This is accomplished by reducing the liquid to a fine spray, mixing it with a stream of hot gas and then recovering the dry powder from the gas. The gas supplies the heat for evaporation and carries off the moisture. The elapsed time for the whole operation ranges from 5–30 seconds in most commercial installations.

The operation consists of atomizing the feed into the drying chamber by spray nozzle or centrifugal atomizer, after which heated air contacts the fine spray intimately to give rapid drying.

In the heater, air is raised to the desired inlet drying temperature, it then passes to the drying chamber and in evaporating the required moisture, is cooled to its outlet temperature. Dry product and air are separated in the product collector, while air and moisture are exhausted from the system of the atmosphere.

The widespread and increasing use of spray drying is due to its overall economy of operation and the desirable characteristics of the dry product. This method of drying can be applied to any liquid (even pastes) that can be pumped. The high surface to mass ratio of the droplets, individually contacting the drying medium at high velocity, makes it possible to dry a great many materials some of which cannot be reduced to powder by any other method.

OBJECTS OF THE INVENTION

It is a primary object of this invention to provide a process whereby polymers can be prepared using spray polymerization.

Another object is to prepare polymers in a relatively short amount of time by means of a spray dryer.

A more specific object of this invention is to devise a process whereby water-soluble vinyl monomers can be polymerized and the solvent removed simultaneously.

Other objects of the invention will become apparent to those skilled in the art in the following detailed description.

THE INVENTION

This invention consists of spraying the monomers into a spray dryer whereby the heat of the incoming air causes the monomers to polymerize. This process of polymerization is efficient, fast, and produces polymers equivalent to those produced by other methods. This method overcomes the need for removing a solvent. The only foreseeable limitations on this process is that only polymers of low molecular weight can be prepared. By the term "monomers" is meant polymerizable monomers and includes catalysts necessary for reaction.

The stepwise process comprises the steps of: (1) making a solution of the monomers to be polymerized. This solution includes any of the desired monomers, which are to be polymerized. Not only homopolymers, but also copolymers and terpolymers can be produced according to this process. The catalyst or catalysts, if any, are included within this solution, and any solvent that would make the monomers more manageable is also added. In the next step, (2) the monomer solution is sprayed into the spray dryer, which is the reaction chamber. The average temperature inside of the spray dryer ranges from 100–400° F. and preferably is from 200–350° F., dependent on the material to be polymerized. The spray is produced by a pressure of from 20–200 p.s.i. In the next step, (3) the monomers come into contact with the stream of hot gas in the spray tower. This gas is preferably air but could be nitrogen, if necessary. The heat of the gas causes the monomers to polymerize. Lastly, (4) the product is recovered from the outlet of the spray tower. When the reaction is complete, the finished product can be recovered. Understandably, the reaction may not be complete until the necessary reaction time has occurred. Thus, the reactants may be transferred to a settling chamber such as the cyclone collector as described in the drawing.

Preferably, acrylamide or acrylamide and methylene bis-acrylamide can be polymerized in this process. But this application should not be restricted to merely these monomers. This process, as indicated, can be useful for polymerizing a wide variety of monomers.

In accordance with this invention all known water-soluble ethylenically-unsaturated monomers may be polymerized according to the process described herein. Such monomers include but should not be restricted to acrylamide, methacrylamide, acrylic acid and methacrylic acid, as well as the water-soluble salts thereof, carboxyethyl acrylate or salts thereof, acrylonitrile, methacrylonitrile, lower alkyl esters and alkyl ether of the acrylic acids, vinyl alkyl ethers, the polycarboxylic acids such as maleic, fumaric, itaconic, aconitic, citraconic acid, etc., which may be polymerized alone or copolymerized with the amides of these acids, the alkali metal derivatives (e.g., sodium, potassium, and lithium), and the alkaline earth metal derivatives (e.g., magnesium, calcium, barium and strontium), and ammonium salts of these acids and the like. Any of these monomers may be polymerized alone or in combination with other monomers.

The hydrolysis of polyacrylonitrile and the hydrolysis of polyacrylamide could also be accomplished by this technique.

The main limitation on this process is that the time of contact is relatively short and therefore only relatively low molecular weight polymers could be prepared according to this process. All vinyl polymers could be prepared according to this process. By vinyl polymers is meant those polymers produced from the monomer having the formula:

$$CH_2=CHR$$

where R is a radical selected from the group consisting of hydrogen or any other chemical functionality which may be polymerized with other monomers or may be homopolymerized or terpolymerized.

SPRAY DRYER DRAWING

A better understanding of the invention might be achieved by reference to the drawing of a typical spray dryer. It should be understood that this spray dryer need not be the one used in the drawing but the drawing is merely illustrative. Obvious modifications such as centrifugal pressure or fan-spray nozzles, rotary atomizers and many modifications are included within this application. The air could be fed through the top, bottom, tangentially or through the sides. The chamber could be rectangular shaped, although the conical shape is preferable.

Inlet 11 is for the heated air. Nitrogen could be used but air is preferred from an economic point of view. Duct 13 is used to convey the hot air from the inlet 11 to the reeciving end 15 of the drying chamber 17. The drying chamber 17 has a conical side wall 23 to allow the polymer to drop to the outlet 25 of the drying chamber 17. Feed line 19 is the conduit for the monomer solution containing the monomers and catalyst. Feed line 19 is connected to an atomizer 27 located in the receiving end 15 of the drying chamber 17. Connecting line 29 connects outlet 25 of the drying chamber 17 to the inlet 31 of the cyclone collector 33. The main blower 41 conveys the exhausted air out of the exhaust 39 from the outlet 45 of the cyclone collector 33. The product drops down the cyclone collector 33 and out the product outlet 35 into the product conveying line 37. The product conveying line 37 discharges the product through product discharge 47. Conveying air blower 43 conveys air through duct 48 to cyclone collector 33 for secondary drying of the product, if necessary.

In summary, the monomer solution is fed into the atomizer 27 while heated air is being blown through duct 13 and into the drying chamber 17. The reactants react and are collected in the cyclone collector 33. The product drops down to the product conveying line 37 to be discharged out of product discharge 47.

This method of polymerization is fast and efficient and eliminates the need for expensive equipment and time consuming methods for removing a solvent when the polymerization process is completed.

This process can be better understood by reference to the following examples.

EXAMPLE I

Three thousand eight hundred grams of acrylamide, 200 grams of methylene bis acrylamide, 25,000 grams of water, and 400 grams of ammonium persulfate were mixed together to make a solution. This solution was then sprayed into a dryer. The temperature of the dryer was 300° F. and the pressure was 125 pounds per square inch. The hot air rushing through the tower caused the monomers to react. A polymerized gel was produced and recovered at the bottom of the spray dryer.

EXAMPLE II

Forty-six pounds of water and 46 pounds of acrylamide were mixed. Two gallons of this solution were then mixed with one gallon of water and 20 cubic centimeters of a 33% by weight solution of $Na_2S_2O_5$ and 20 cubic centimeters of a 33% by weight solution of $Na_2S_2O_8$. This was then sprayed into the spray dryer. The acrylamide was lost through the vent. This resulted from the fact that the catalyst was not sufficient to polymerize the acrylamide in the amount of time of contact in the spray dryer.

EXAMPLE III

The same amounts were run as in Example II except that 50 cc. of $Na_2S_2O_5$ and 50 cc. of $Na_2S_2O_8$ were added. This produced a polymer. The polymerization was complete and the product dropped to the bottom. The average molecular weight of this polyacrylamide was 13,000 as determined by conventional intrinsic viscosity measurements.

Theoretically, the lower amount of catalyst could produce the polymer, if a large tower was used so that the residence time could be increased and thus sufficient reaction time could be achieved.

EXAMPLE IV

One liter of a 50% by weight solution of acrylamide in water was mixed with 100 ml. of a 5% solution of Vazo catalyst (azobisisobutyronitrile) in methanol. This was then sprayed into the spray dryer. The product was collected and found to have an average molecular weight of 215,000 as determined by an intrinsic viscosity measurement. On account of either the different catalyst, the lower catalyst level, or both, some monomer loss was noted.

In summary, this process involves spraying reactants into a spray dryer, so that the spray dryer acts as a reaction chamber for the polymerization of the reactants. This is a fast and efficient method of producing polymers.

We claim:
1. A process of spray polymerization which comprises the steps of:
    (A) making a solution of a catalyst and of the water-soluble vinyl monomer to be polymerized to form a monomer solution;
    (B) spraying the monomer solution into a spray dryer at a temperature of from 100–400° F. at a pressure of from 20–200 p.s.i.;
    (C) polymerizing by contact with a stream of hot gas selected from the group consisting of air and nitrogen in a spray tower; and
    (D) drying and recovering the polymerized product from the spray tower.
2. The process of claim 1 in which the monomer to be polymerized is acrylamide.
3. The process of claim 1 in which the polymer solution consists of acrylamide, methylene bis-acrylamide, ammonium persulfate and water.

References Cited

UNITED STATES PATENTS 2,566,149    8/1957    Strain _____ 260—80
3,453,245    7/1969    Glavis _____ 260—78.5

JOSEPH L. SCHOFER, Primary Examiner

S. M. LEVIN, Assistant Examiner

U.S. Cl. X.R.

260—78.4 R, 78.5 R, 80 M, 88.7 G, 89.3, 89.5 A, 89.7 R, 91.1 M; 159—4